United States Patent
Nakano et al.

(10) Patent No.: US 6,903,546 B2
(45) Date of Patent: Jun. 7, 2005

(54) ROTATION DETECTION SENSOR

(75) Inventors: Satohiko Nakano, Chiryu (JP); Masakazu Takeuchi, Aichi-ken (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/739,281

(22) Filed: Dec. 19, 2003

(65) Prior Publication Data
US 2004/0150392 A1 Aug. 5, 2004

(30) Foreign Application Priority Data
Dec. 19, 2002 (JP) ........................................ 2002-368488

(51) Int. Cl.$^7$ ................................................ G01B 7/30
(52) U.S. Cl. ................................................ 324/207.25
(58) Field of Search ..................... 324/207.11, 207.13, 324/207.2, 207.21, 207.22, 207.23–207.26; 174/52.1, 52.2, 52.3, 52.4; 264/271.11, 271.13, 271.14, 271.15; 29/602.1, 841

(56) References Cited

U.S. PATENT DOCUMENTS 6,053,046 A * 4/2000 Masaki et al. ............ 73/514.39
6,677,747 B2 * 1/2004 Sakanoue ............... 324/207.25

FOREIGN PATENT DOCUMENTS

JP 3-48768 9/1989
JP 2-307249 * 12/1990

OTHER PUBLICATIONS

Takiguchi, Iwao, Method of Packaging Hybrid, dated Dec. 20, 1990, JPO&Japio, translation of Patent No. JP402307249A.*

* cited by examiner

Primary Examiner—Bot LeDynh
(74) Attorney, Agent, or Firm—Reed Smith LLP; Stanley P. Fisher, Esq.; Juan Carlos A. Marquez, Esq.

(57) ABSTRACT

A rotation detection sensor provided at a cover member relative to a non-rotation member includes a fitting member including a convex portion inserted into an assembling bore formed on the cover member and a detection portion provided at the fitting member and facing a rotor. The convex portion is unitarily formed with the cover member with resin molding.

7 Claims, 5 Drawing Sheets

ROTATION DETECTION SENSOR

This application is based on and claims priority under 35 U.S.C. § 119 with respect to Japanese Patent Application No. 2002-368488 filed on Dec. 19, 2002, the entire contents of which are incorporated herein by reference.

FIELD OF THE INVENTION

The present invention relates to a rotation detection sensor. More particularly, the present invention pertains to a rotation detection sensor unitarily formed with a cover member provided relative to a non-rotation member.

BACKGROUND OF THE INVENTION

A known rotation detection sensor includes a sensor for detecting a rotation speed of vehicle wheels. The sensor for detecting the rotation speed of the vehicle wheel is provided relative to an outer race rotatably supporting a hub unitary rotating with the wheel. The known rotation sensor described in Japanese Utility Model Laid-Open Publication No. 03-48768 is configured to detect the rotation of a rotor unitarily rotated with the hub at a portion of a cover member covering an end portion of the outer race in an axial direction.

With the sensor described in Japanese Utility Model Laid-Open Publication No. 03-48768, a bore is formed at the metal made cover member for covering the end portion of the outer race in the axial direction. The sensor is unitarily formed with the cover member by insert molding in the bore. Small bores are formed at sides of the bore formed on the cover member. By charging the molding resin to the small bores, the sensor is fixed to the cover member.

Notwithstanding, with the known sensor described in Japanese Utility Model Laid-Open Publication No. 03-48768, the molding has to be performed after determining positions of the cover member and a body of the sensor relative to a molding type for the insert molding. Because the different sizes and the different configurations of the cover member require different dies, the construction of the known rotation detection sensor is not efficient for multi-product production.

A need thus exists for a rotation sensor which is applicable to cover members with different sizes and configurations.

SUMMARY OF THE INVENTION

In light of the foregoing, the present invention provides a rotation detection sensor provided at a cover member relative to a non-rotation member which includes a fitting member including a convex portion inserted into an assembling bore formed on the cover member and a detection portion provided at the fitting member and facing a rotor. The convex portion is unitarily formed with the cover member with resin molding.

According to another aspect of the present invention, a rotation detection sensor provided at a cover member relative to a non-rotation member includes a flange portion formed at the cover member, a detection portion, and a fitting member provided with the detection portion, the fitting member being fitted into the flange portion. The fitting member and the detection portion are unitarily fixed to the cover member with the resin molding.

According to further aspect of the present invention, a rotation detection sensor includes a manufacturing process of securing a seal member to a groove portion formed at a convex portion of a connector for sealing a connector and a cover member, assembling the cover member by positioning the convex portion of the connector at an assembling bore with a position determining portion of the cover member, inserting the connector with the cover member into a bottom die, maintaining an end surface of the cover member contacting a top surface of the bottom die, moving a top die downward to contact an internal surface of the cover member, and charging a resin into a space formed between the top die and the internal surface of the cover member to unitarily form the cover member with a Hall element and the convex portion.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

FIG. 1 a view applying a rotation detection sensor to a sensor for detecting a vehicle wheel speed provided with the a hub unit according to a first embodiment of the present invention.

DETAILED DESCRIPTION OF THE INVENTION

Figure 1:
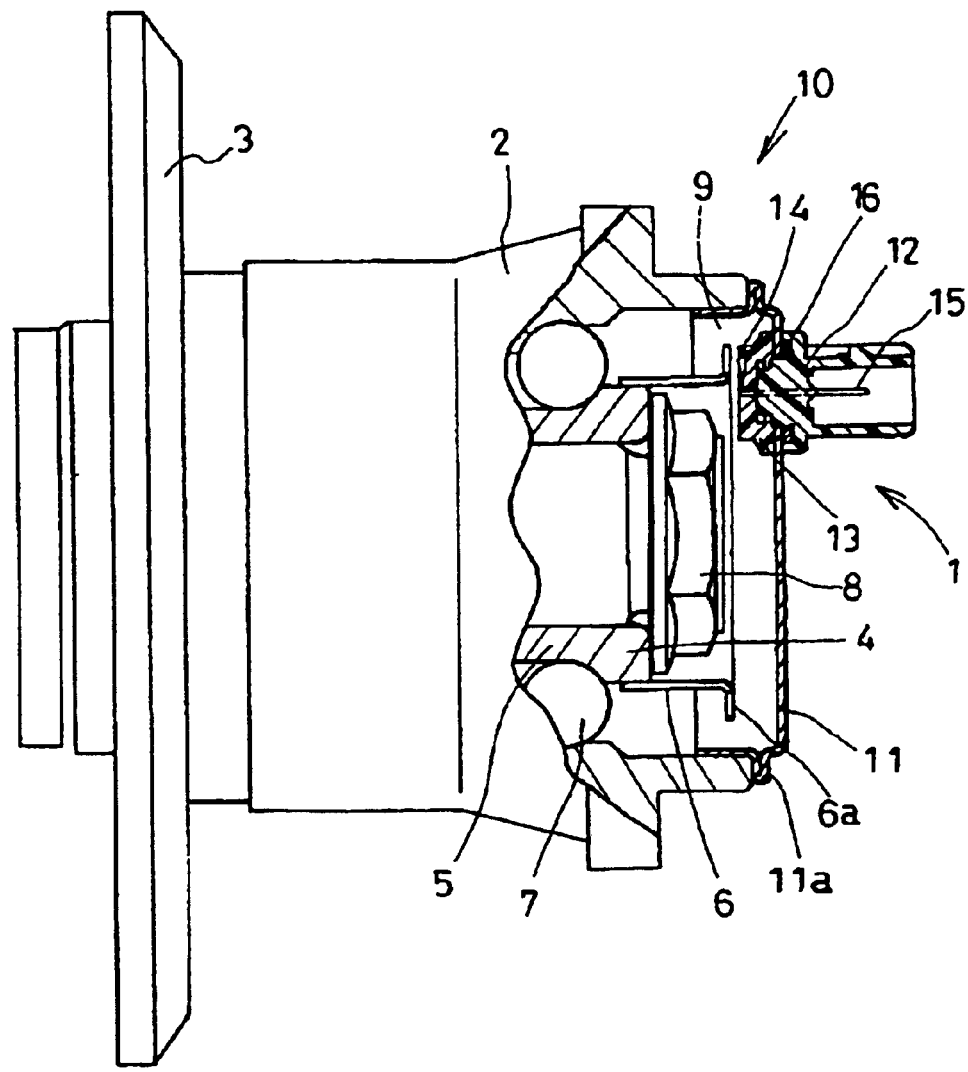

Embodiments of the present invention will be explained with reference to drawing figures as follows. As shown in FIG. 1, a rotation detection sensor 1 is assembled to a hub unit 10 of a vehicle with the embodiments. The hub unit 10 includes an outer race 2, an inner race 4, a rotor 6, and a cover member 11 provided with the rotation detection sensor 1. The rotation detection sensor 1 includes a connector (i.e., a fitting member) 12 including a convex portion 12a at one end thereof and a Hall element (i.e., serving as a detection portion) 14 provided on the connector 12 and facing the rotor 6.

The outer race 2 of the hub unit 10 is fixed to a non-rotation member on a vehicle body side. The outer race 2 made of metal such as iron is configured to have a cylindrical shape with a hollow. In the meantime, the inner race 4 is provided in the outer race 2 via bearings 7 arranged in parallel with each other in the axial direction. The inner race 4 includes a cylindrical portion 5 positioned in the outer race 2 and a flange portion 3 unitarily formed with the cylindrical portion 5. A vehicle wheel is fixed to the flange portion 3 from the axial direction. A nut 8 is provided at an end portion (i.e., right side of FIG. 1) of the cylindrical portion 5 in the axial direction. The cylindrical rotor 6 is unitarily assembled to the cylindrical portion 5 of the inner race 4. The rotor 6 made from a magnetic body includes a flange portion 6a in a radial direction. The north pole and the south pole are alternately magnetized at the flange portion 6a of the rotor 6 in the peripheral direction.

The cover member 11 for covering an opening 9 formed at a first side of the outer race 2 different from a second side fixed with the vehicle wheel (i.e., left side of FIG. 1) is press fitted from the axial direction to be fitted in the second end of the outer race 2.

The rotation detection sensor 1 is unitarily formed on the cover member 11. The Hall element 14 facing a magnetized surface of the flange portion 6a of the rotor 6, for detecting the rotation of the rotor 6 by the change of the flux passing the Hall element 14 with no contact. The output proportional to the rotation speed of the rotor 6 is outputted from two terminals 15, 15 when the rotor 6 rotates. The Hall element 14 is electrically connected to each end of the terminals 15, 15. The terminals 15, 15 are insert molded when molding the connector 12 fitted with the external connector. The Hall element 14 is supported relative to the connector 12. In this case, although the Hall element 14 is supported by the terminals 15, 15 in the embodiment, the Hall element 14 may be supported by different parts relative to the connector 12. The Hall element 14 may be assembled afterwards relative to the connector 12 or the different parts assembled to the cover member 11. The connector 12 includes an annular groove portion at a contact surface with the cover member 11. A seal member (e.g., O-ring) 16 is provided at the groove portion to prevent the invasion of the water from the outside of the connector 12 into the cover member 11.

The Hall element 14 is provided facing the flange portion 6a of the rotor 6 while providing the cover member 11 to the outer race 2. In other words, when the rotor 6 rotates, the flange portion 6a on which the north pole and the south pole are alternately magnetized is unitarily rotated with the rotor 6 to determine a rotation angle by detecting the change of the flux by the Hall element 14. A signal ditected by the Hall element 14 may be detected by the external connector fitted to the connector 12.

Figure 2:
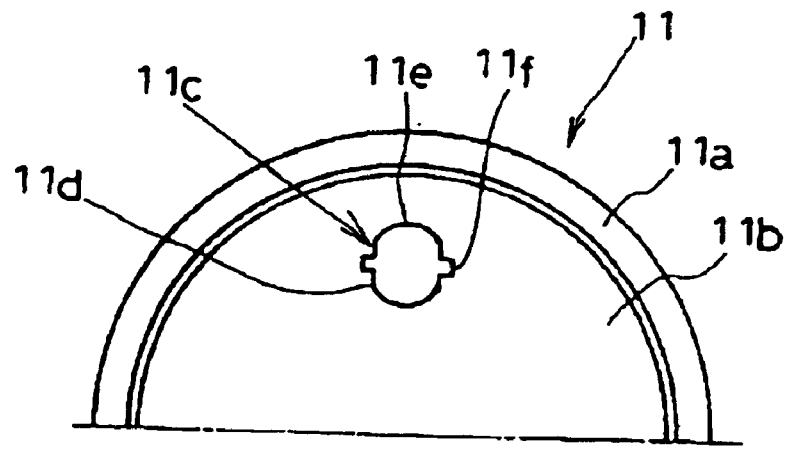
FIG. 2 is a plane view showing a configuration of a bore formed on a cover member shown in FIG. 1.

The construction for assembling the sensor of the rotation detection sensor 1 will be explained as follows. As shown in FIG. 2, the cover member 11 made of metal includes a configuration of a circular cup. The cover member 11 is formed by stamping. The cover member 11 includes a flange portion 11a unitarily formed at a portion of the cover member 11 in the axial direction. When the cover member 11 is assembled to the outer race 2 from the axial direction, a press-in overlap widths in the axial direction is restricted and is press fitted into a predetermined depth so that an interval between the Hall element 14 and the rotor 6 assumes a predetermined distance by a length from the flange portion 11a to a flat portion of the cover member 11 covering the opening 9.

The cover member 11 includes an assembling bore 11c for assembling the connector 12 to an end surface 11b. The assembling bore 11c includes width across flat portions 11d including parallel sides and arc portions 11e between the width across flat portions 11d. The assembling bore 11c further includes a position determining portion 11f at an intermediate position of the width across flat portions 11d.

The connector 12 is configured to be the same configuration with the assembling bore 11c formed on the cover member 11. The connector 12 includes a convex portion 12a configured to be located in the assembling portion 11c. The connector 12 is assembled to the cover member 11 by inserting and fitting the convex portion 12a into the assembling portion 11c. In this case, a terminal bent in an L shape of the Hall element 14 is electrically connected to the terminal 15 by spot welding, or the like. A fixing portion 13 is resin molded while locating the convex portion 12a of the connector 12 insert-molded with the terminal 15 in the assembling bore 11c formed on the cover member 11. In this case, the fixing portion 13 covers the Hall element 14 and the convex portion 12a and the terminal 15 connected to the Hall element 14 to fix the connector 12 relative to the cover member 11. The connector 12 includes a first groove portion (i.e., serving as a stopper portion) 12b peripherally configured to prevent the dislocation of the convex portion 12a of the connector 12 in the axial direction. The resin charged at the fixing portion 13 is spread to be charged to the first groove portion 12b at the resin molding of the fixing portion 13 to prevent the dislocation of the connector 12 in the axial direction.

Figure 3:
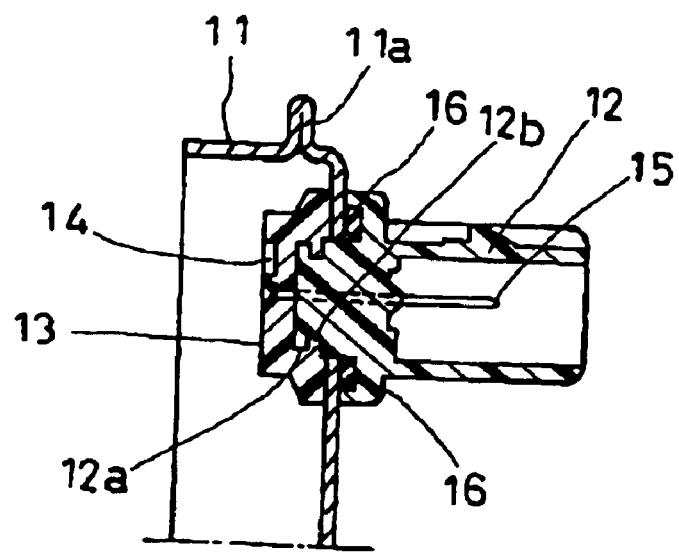
FIG. 3 is a partially enlarged cross-sectional view showing the assembling of the rotation detection sensor shown in FIG. 1.
Figure 4A:
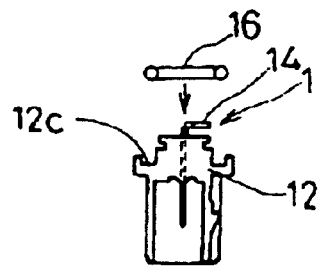
FIG. 4a is a view showing a step an assembling process for unifying the rotation detection sensor and the cover member shown in FIG. 1.
Figure 4B:
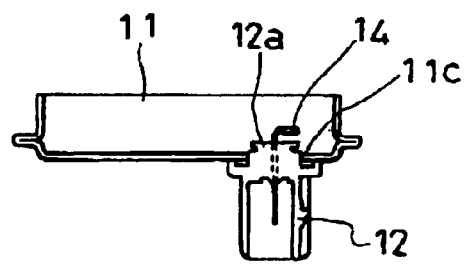
FIG. 4b is a view showing a step of the assembling process for unifying the rotation detection sensor and the cover member shown in FIG. 1.
Figure 4C:
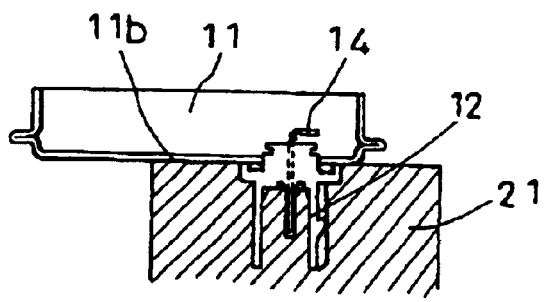
FIG. 4c is a view showing a step of the assembling process for unifying the rotation detection sensor and the cover member shown in FIG. 1.
Figure 4D:
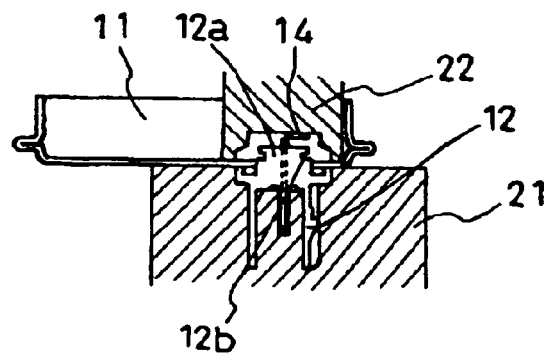
FIG. 4d is a view showing a step of the assembling process for unifying the rotation detection sensor and the cover member shown in FIG. 1.

The assembling process of the rotation detection sensor 1 to the cover member 11 will be explained with reference to FIGS. 4a–4d. As shown in FIG. 4a, the seal member 16 is secured to a second groove portion 12c formed at the convex portion 12a for sealing between the connector 12 and the cover member 11. With a step as shown in FIG. 4b, the cover member 11 is assembled by positioning the convex portion 12a of the connector 12 secured with the seal portion 16 relative to the assembling bore 11c of the cover member 11 with the position determining portion 11f. With a step shown in FIG. 4c, the cover member 11 with the connector 12 is inserted into a bottom die 21 for the resin molding. Thereafter, the end surface 11b of the cover member 11 is maintained to securely contact a top surface of the bottom die 21. At a step shown in FIG. 4d, in order to cover the convex portion 12a and the Hall element 14 with the resin from an opening end side of the cover member 11, a top die 22 is moved downward to contact an internal surface of the cover member 11 so that the resin is charged into a concave shaped cavity space of the top die 22 to unitarily form the Hall element 14 and the convex portion 12a relative to the cover member 11. In this case, the resin is charged to the first groove portion 12b formed at the convex portion 12a to form the fixing portion 13 for preventing the dislocation of the connector 12 in the axial direction. Thus, the rotation detection sensor 1 and the cover member 11 are unitarily formed as shown in FIG. 3.

Accordingly, because the position of the connector 12 including the Hall element 14 is directly determined relative to the cover member 11 by the convex portion 12a, the position of the cover member 11 is determined by fixing the connector 12 in the bottom die 21 by determining the position of the cover member 11 relative to the connector 12 by corresponding the size and the configuration of the assembling bore 11c to an external configuration of the convex portion 12a of the connector 12 irrespective of the size and the configuration of the cover member 11. Thus, it is not necessary to manufacture dies for every different type of the cover members even if the size and the configuration of the cover member 11 is changed depending on the types of the vehicles because only matched pair of top and bottom dies corresponding to the configuration of the connector 12 is sufficient for the positioning.

Although the Hall element 14 is supported relative to the terminal 15 with the embodiments, the Hall element 14 may be supported by another member. Although the Hall element 14 is used for the magnetic detection in the embodiment, the magnetic detection may be performed with other parts other than Hall IC, for example, the magnetic resistance element. Although the Hall element 14 is positioned in the assembling bore 11c of the cover member 11 at assembling the rotation detection sensor 1 to the cover member 11 with the embodiments, the Hall element 14 may be assembled afterwards in case the Hall element 14 is provided outside of the assembling bore 11c.

Figure 5:
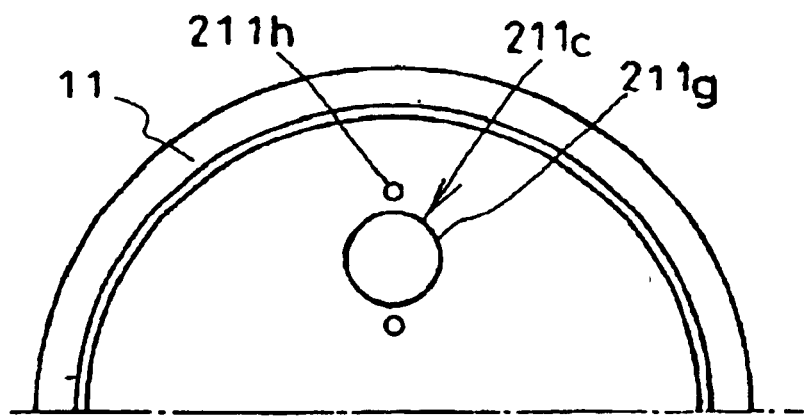
FIG. 5 is a plane view showing a configuration of a bore formed on a cover member according to a second embodiment of the present invention.
Figure 6:
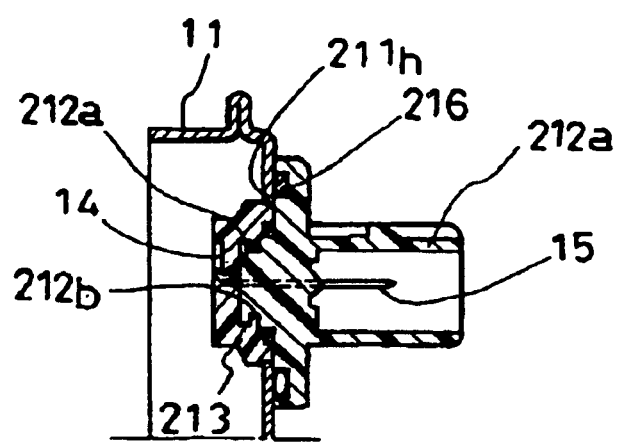
FIG. 6 is a partial cross-sectional view showing the assembling of the rotation detection sensor to the cover member shown in FIG. 5.

A second embodiment of the present invention is explained with reference to FIGS. 5–6. With the second embodiment of the present invention, the configuration of an assembling bore 211c may be, for example, as shown in FIGS. 5–6. The configuration of the assembling bore 211c is different from the first embodiment and other construction. The explanation of the constructions the same with the first embodiment is not repeated. The assembling bore 211c to be assembled with the connector 12 includes an inserting bore 211g configured to be corresponding to the external diameter of a convex portion 212a inserted with the convex portion 212a and two position determining bores 211h, 211h formed around the inserting bore 211g. When a fixing portion 213 is molded after locating the convex portion 212a of the connector 12 in the inserting bore 211g, the resin for molding the fixing portion 213 is supplied to the position determining portions 211h, 211h to be charged. By molding the fixing portion 213, the connector 12 is prevented to be dislocated by a first groove portion (i.e., serving as a stopper portion) 212b and the position of the connector 12 is determined simultaneously.

Figure 7:
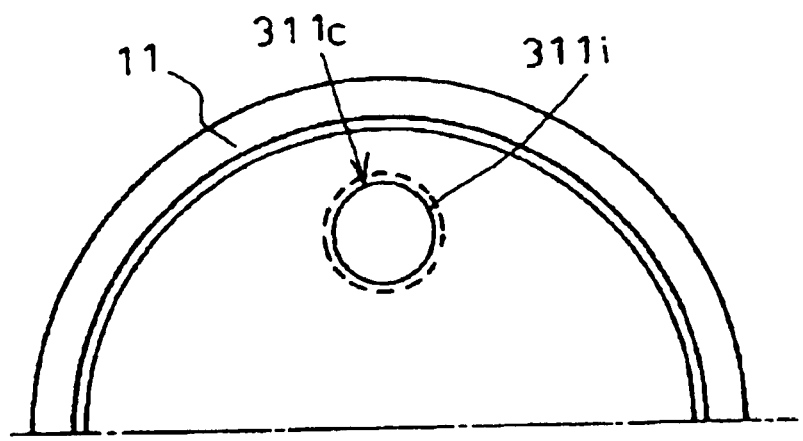
FIG. 7 is a plane view showing a configuration of a bore formed on a cover member according to a third embodiment of the present invention.
Figure 8:
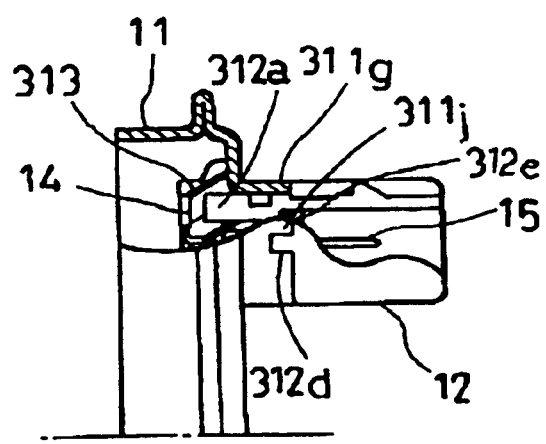
FIG. 8 is a partial cross sectional view showing the assembling of the rotation detection sensor to the cover member shown in FIG. 7.

A third embodiment of the present invention will be explained with reference to FIGS. 7–8. As shown in FIGS. 7–8, in case an assembling bore 311c is formed on the cover member 11, the cover member 11 includes a flange portion 311i formed by the burring and the flange portion 311i includes a recessed position determining portion 311i at a portion on the lateral surface of the flange portion 311i. In this case, a position determining portion 312d of a connector 312 including the Hall element 14 and insert-molded with the terminal 15 electrically connected with the Hall element 14 is configured to correspond to the position determining portion 311j formed on the cover member 11. With this construction, after inserting a convex portion 312a formed with the connector 312 along the internal surface of the flange portion 311i formed on the cover member 11 by positioning the position determining portion 311j of the cover member 11 relative to the position determining portion 312d of the connector 312, a fixing portion 313 may be molded by covering the Hall element 14 and the convex portion 312a with the resin with the assembling steps as shown in FIGS. 4a–4d. In this case, when the fixing portion 313 is molded with the resin, the resin is charged to and around the convex portion 312a to configure a stepped diameter portion in the axial direction. The resin is also charged to a stopper portion 312e for preventing the dislocation of the connector 312 in the axial direction to unitarily fix the fixing portion 313 with the connector 312.

With the foregoing construction, because the position of the cover member 11 relative to the connector 312 is directly determined by the position determining portion 312d formed on the connector 312 and the position determining portion 311j formed on the cover member 11, the positioning of the cover member 11 relative to the connector 312 is determined by corresponding the position determining portion 311j and the position determining portion 312d to be secured irrespective of the size and the configuration of the cover member 11. Thus, it is not necessary to manufacture dies for every cover members because only the matching pair of the top die and the bottom die corresponding to the configuration of the connector 312 is sufficient for the positioning even if the size and the configuration of the cover member 11 is varied. This enables the rotation detection sensor to be applicable to different types of the covers.

According to the embodiments of the present invention, the rotation detection sensor includes the fitting member including the convex portion inserted into the assembling bore formed on the cover member and the detection member provided at the fitting member and facing the rotor. The convex portion is unitarily formed with the cover member with the resin molding. With this construction, the positioning of the assembling bore of the cover member is determined by the convex portion by inserting the convex portion of the fitting member into the assembling bore formed on the cover member. By unifying the convex portion located in the assembling bore with the cover member with the resin molding, the fitting member and the cover member is unitarily formed only by determining the position of the cover member relative to the fitting member. Thus, it is not required to determine the position of the cover member and the detection portion simultaneously, which enables the rotation detection sensor to be applicable to the cover member with the different sizes and configurations.

In this case, by providing the position determining portion on the cover member relative to the convex portion, the positioning of the fitting member is securely determined to be unitarily formed with the cover member.

By providing the groove portion for preventing the dislocation at the convex portion, the resin is supplied to the groove portion to prevent the dislocation of the fitting member relative to the cover member.

Further, by providing the position determining bore around the assembling bore of the cover member and the resin is charged to the position determining bore, the fitting member can be further securely positioned relative to the cover member.

According to the embodiments of the present invention, by providing the flange on the cover member and providing the fitting member including the detection portion into the flange, the positioning of the cover member relative to the fitting member is determined by the flange. Because the fitting member including the detection portion is unitarily fixed to the cover member with the resin molding, the fitting member and the cover member can be unitarily formed only by determining the position of the fitting member. Thus, it is not required to determine the position of the cover member and the detection member simultaneously and this enables the rotation detection sensor to be applicable to the cover member with the different sizes and the configurations.

The principles, preferred embodiment and mode of operation of the present invention have been described in the foregoing specification. However, the invention which is intended to be protected is not to be construed as limited to the particular embodiments disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A rotation sensor according comprising:
   a hub unit having a non-rotation outer race, an inner race, a rotor rotating with the inner race, and a cover member mounted on the outer race and covering an opening thereof;
   a fitting member including a convex portion inserted into an assembling bore formed on the cover member;
   a detection portion provided at the fitting member and facing the rotor; and
   a position determining portion formed on the cover member for positioning the convex portion,
   wherein the convex portion unitarily is formed with the cover member by resin molding.

2. The rotation sensor according to claim 1, further comprising:
   a stopper portion formed at the convex portion for preventing the dislocation of the fitting member from the cover member.

3. The rotation detection sensor according to claim 1, wherein the cover member has a flange portion fitted with the non-rotation outer race.

4. A rotation sensor provided at a cover member relative to a non-rotation member comprising:
   a fitting member including a convex portion inserted into an assembling bore formed on the cover member;
   a detection portion provided at the fitting member and facing a rotor;
   a position determining portion formed on the cover member for positioning the convex portion; and
   a position determining bore provided around the assembling bore of the cover member,
   wherein the convex portion unitarily formed with the cover member with resin molding, and
   the position determining bore is charged with a resin for unifying the cover member and the convex portion by resin molding.

5. A rotation detection sensor comprising a manufacturing process of:
   securing a seal member to a groove portion formed at a convex portion of a connector for sealing a connector and a cover member;
   assembling the cover member by positioning the convex portion of the connector at an assembling bore with a position determining portion of the cover member;
   inserting the connector with the cover member into a bottom die;
   maintaining an end surface of the cover member contacting a top surface of the bottom die;
   moving a top die downward to contact an internal surface of the cover member; and
   charging a resin into a space formed between the top die and the internal surface of the cover member to unitarily form the cover member with a Hall element and the convex portion.

6. A hub bearing comprising:
   a non-rotation outer race having an opening;
   an inner race relatively rotating to the outer race;
   a rotor fixed to the inner race;
   a cover member mounted on the outer race and covering the opening of the outer race;
   a detection portion for detecting the rotation of the inner race, said detection portion having a fitting member with a convex portion inserted into an assembling bore formed on the cover member; and
   a position determining portion formed on the cover member for positioning the convex portion,
   wherein the convex portion is unitarily formed with the cover member by resin molding.

7. The hub bearing according to claim 6, further comprising:
   a stopper portion formed at the convex portion for preventing the dislocation of the fitting member from the cover member.

* * * * *